United States Patent
Hsieh (10) Patent No.: US 6,832,100 B2
(45) Date of Patent: Dec. 14, 2004

(54) MAGNETIC HINGE APPARATUS

(75) Inventor: Yung-Tsun Hsieh, Changhua (TW)

(73) Assignee: BENQ Corporation, Taoyuan (TW)

( * ) Notice: Subject to any disclaimer, the term of this patent is extended or adjusted under 35 U.S.C. 154(b) by 431 days.

(21) Appl. No.: 10/112,876

(22) Filed: Apr. 2, 2002

(65) Prior Publication Data

US 2002/0147026 A1 Oct. 10, 2002

(30) Foreign Application Priority Data

Apr. 4, 2001 (TW) ........................................ 90205276 U (51) Int. Cl.$^7$ .............................................. H04M 1/00
(52) U.S. Cl. ................................ 455/550.1; 455/575.1; 455/575.3; 379/433.13
(58) Field of Search ........................... 455/550.1, 575.1, 455/575.3, 90.3, 347, 348, 351; 379/433.01, 433.11, 433.13, 440; 335/285, 288, 302, 306

(56) References Cited

U.S. PATENT DOCUMENTS

| | | | | |
|---|---|---|---|---|
| 5,274,882 A | * | 1/1994 | Persson | 16/303 |
| 5,987,122 A | * | 11/1999 | Daffara et al. | 379/433.13 |
| 6,151,486 A | * | 11/2000 | Holshouser et al. | 455/575.3 |
| 6,353,733 B1 | * | 3/2002 | Murray et al. | 455/90.1 |
| 6,630,878 B2 | * | 10/2003 | Pan et al. | 335/285 |

FOREIGN PATENT DOCUMENTS

JP 7-202787 8/1995

* cited by examiner

*Primary Examiner*—Sonny Trinh (57) ABSTRACT

A magnetic hinge apparatus is applicable to a foldable product (such as folding cellular phone) for connecting the cover and the base. A practical application is provided by aligning two magnetic cams on a shaft. One magnetic cam is connected to the base, and the other is connected to the cover. Also, an attractive force is formed between the opposite surfaces of the two opposite magnetic cams. Before applying any external force on the foldable product, the convex portion of one magnetic cam completely engages the concave portion of the other magnetic cam. When the cover is opened, both magnetic cams are rotated relatively and then separated from the engaged position. When the cover keeps in opening, the convex portions of both magnetic cams are going to touch and then across each other; meanwhile, the magnetic force can attract two magnetic cams back to the engaged position. Accordingly, the foldable product secured by the magnetic hinge apparatus possesses the snap characteristic.

17 Claims, 9 Drawing Sheets

MAGNETIC HINGE APPARATUS

This application incorporates by reference of Taiwan application Serial No. 90205276, filed Apr. 4, 2001.

BACKGROUND OF THE INVENTION

1. Field of the Invention

The invention relates in general to a hinge apparatus, and more particularly to a magnetic hinge apparatus.

2. Description of the Related Art

The trend of the portable device such as cellular phone is leaded towards the lighter, the thinner, and the smaller. Each component of the portable device has to be miniaturized. For example, cellular phone, the most popular portable product, has been through the great revolution in appearance design. Conventionally, the button portion of cellular phone is uncovered, and then a cover is added to protect the buttons from careless touch. The present cellular phone is further designed to be folded up for easy to carry. The exterior of cellular phone is lighter and handier. As a folding cellular phone presents, the display and the buttons are respectively equipped on the lid and body portion, and connected by a hinge apparatus. Hence, the folding cellular phone has an open position in the communication, and a close position at rest. The volume of cellular phone is greatly reduced due to its foldability. In the present cellular phone, a spring is mostly adopted of the hinge apparatus for providing a torsion force.

Figures 1A, 1B:
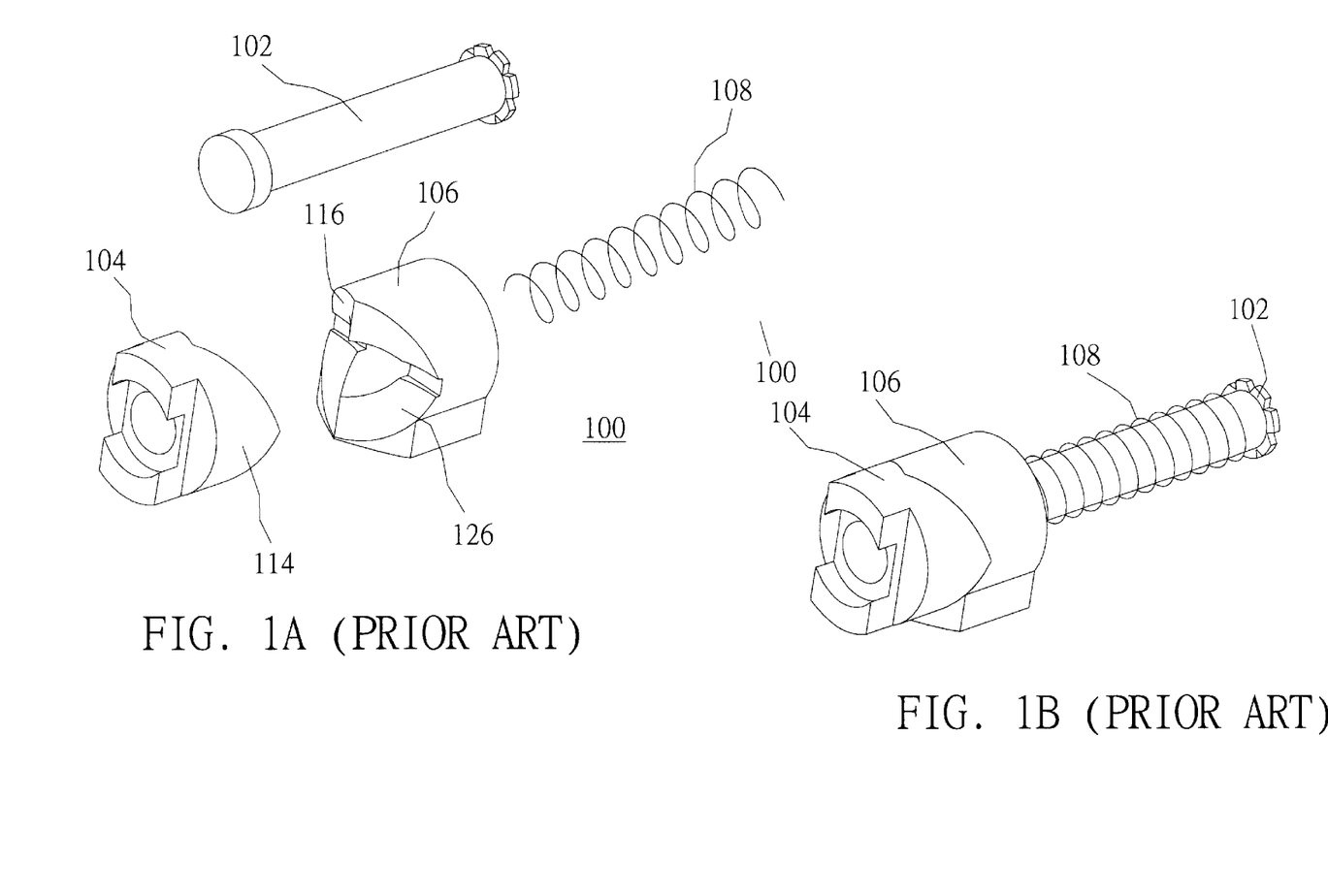
FIG. 1A (Prior Art) shows the components of a conventional spring type hinge apparatus.
FIG. 1B (Prior Art) is a perspective view of the assembled spring type hinge apparatus according to 1A.

Referring to FIG. 1A, which shows the components of a conventional spring type hinge apparatus. The spring type hinge apparatus 100 includes a flanged shaft 102, a first cam 104, a second cam 106, and a spring 108. The first cam 104 has a convex portion 114 and a concave portion (not shown) in the profile. Also, the second cam 106 has a convex portion 116 and a concave portion 126 in the profile.

FIG. 1B is a perspective view of the assembled spring type hinge apparatus according to 1A. When assembling the spring type hinge apparatus, the flanged shaft 102 is inserted through the first cam 104, the second cam 106, and the spring 108. The convex portion 114 and the concave portion (not shown) of the first cam 104 are engaged with the concave portion 126 and the convex portion 116 of the second cam 106, respectively. It is noted that the elastic force from the compressed spring 108 pushes the second cam 106 towards the first cam 104 since the spring 108 coupled to the flanged shaft 102 resists one end of the second cam 106. Therefore, the first cam 104 and the second cam 106 are tightly engaged.

In the practical application, the spring type hinge apparatus 100 can be installed in any device having a cover (lid) and a base, to make the device semi-automatically open and close. For example, the spring type hinge apparatus 100, situated in the cellular phone for connecting the cover and the base, allows the pivoting of the cover on the base. In one practical case, the first cam 104 is fixed to the base while the second cam 106 is fixed to the cover. When the cellular phone is closed, the convex portion 114 and the concave portion of the first cam 104 are engaged with the concave portion 126 and the convex portion 116 of the second cam 106, respectively. When the cover of cellular phone is opened, the second cam 106 is simultaneously rotated with the cover so as to separate from the first cam 104.

It is noted that the second cam 106 is movably engaged on the flanged shaft 102. When the second cam 106 is rotated with the cover, the convex portion 116 is apart from the concave portion of the first cam 104, and then moves along the profile of the first cam 104 towards the convex portion 114; therefore, the second cam 106 is moved outward along the flanged shaft 102, and the spring 108 is compressed consequently. When the cover is opened to a specific angle that the convex portion 116 of the second cam 106 is against the convex portion 114 of the first cam 104, the maximum compression of the spring 108 is achieved. If the cover keeps on opening, the convex portion 116 of the second cam 106 is going to move across the convex portion 114 of the first cam 104, and the recovery force released from the spring 108 will push the second cam 106; thus, the second cam 106 moved inward along the flanged shaft 102 until the convex portion 116 of the second cam 106 engaged with another concave portion of the first cam. After both cams engage tightly again, the cellular phone is in full-opened condition. Similarly, the hinge action during the close condition is performed in reverse order.

Figure 2:
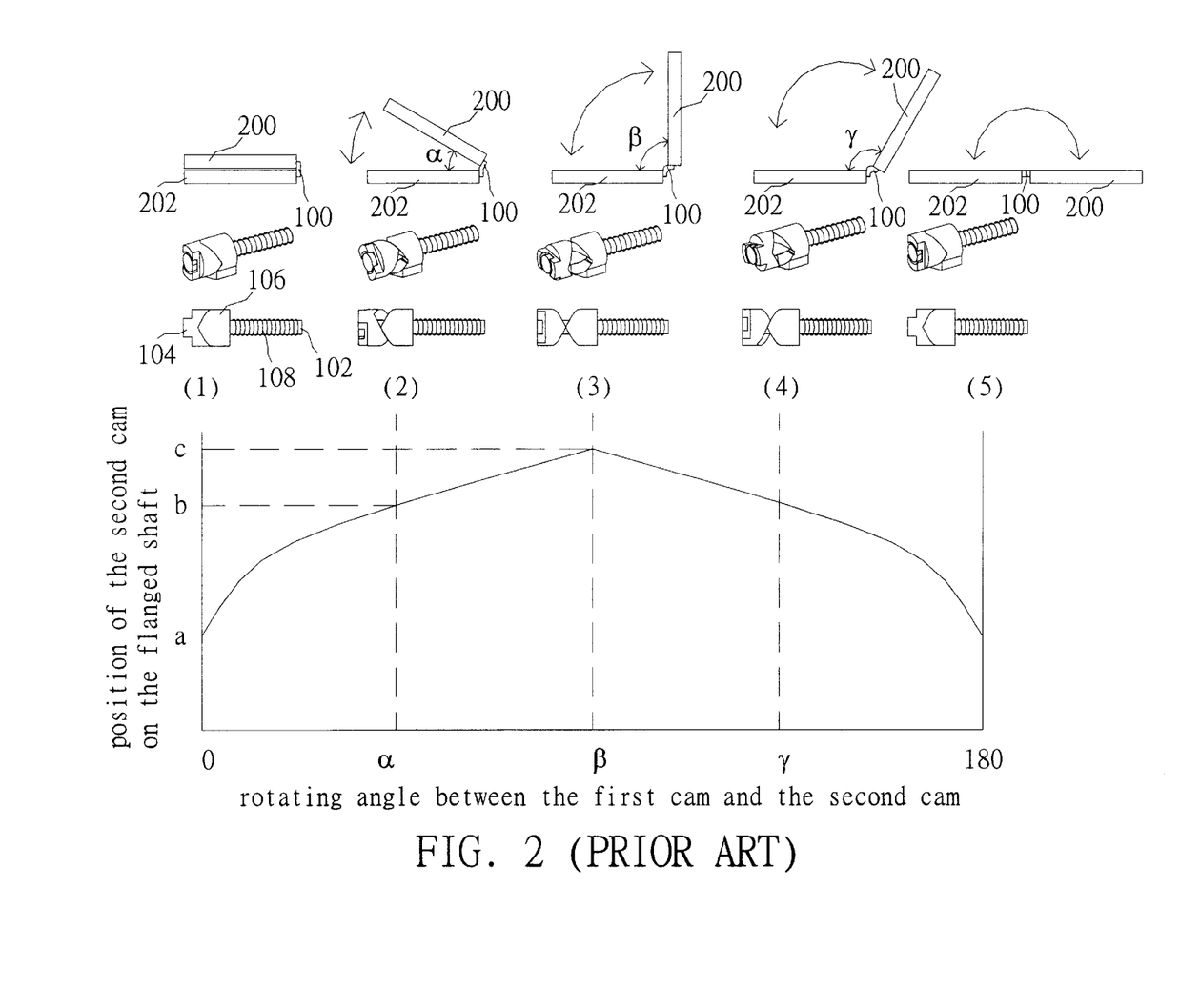
FIG. 2 (Prior Art) shows operation of the conventional spring type hinge apparatus equipped in a folding cellular phone.

Referring to FIG. 2, which shows operation of the conventional spring type hinge apparatus equipped in a folding cellular phone. The spring type hinge apparatus 100 pivotally connects the cover 200 and the base 202 of a folding cellular phone. The first cam 104 is connected to the base 202, and the second cam 106 is connected to the cover 200. In FIG. 2, the X-coordinate represents the rotating angle between the first cam 104 and the second cam 106. The Y-coordinate represents the position of the second cam 106 on the flanged shaft 102. When the opening angle of the folding cellular phone is 0°, the first cam 104 and the second cam 106 are tightly engaged to each other, and the second cam 106 is located on the flanged shaft 102 at position a.

When user keeps opening the cellular phone until the angle á, the convex portion 116 of the second cam 106 is apart from the concave portion of the first cam 104, and consequently the second cam 106 moves outward (away from the first cam 104) along the flanged shaft 102 to position b. Meanwhile, as spring 108 is compressed, the elastic recovery force will push the second cam 106 to move the first cam 104 inward when the external force is removed.

When the cellular phone is opened to the angle â, the convex portion 116 of the second cam 106 touches the convex portion 114 of the first cam 104. Meanwhile, the second cam 106 slides along the flanged shaft 102 to position c, and the compression of the spring 108 has reached its maximum. Consequently, an elastic recovery force is generated in converse direction. According to the foregoing illustration, it is required an external force to overcome the elastic recovery force while the opening angle has switched from 0° to â.

When the opening force to the cover 200 is continued and the opening angle is ã, the convex portion 116 of the second cam 106 is separated from the convex portion 114 of the first cam 104, and moves towards the other concave portion of the first cam 104. Simultaneously, the second cam 106 is propelled by the elastic recovery force generated from the compressed spring 108, and moves close to the first cam 104. Therefore, the cover is automatically flipped up without applying any external force.

When the cellular phone is full-opened (the opening angle is 180°), the convex portion 116 of the second cam 106 engages with the concave portion of the first cam 104, and the second cam 106 on the flanged shaft 102 is back to position a. In the meanwhile, the elastic recovery force of the spring 108 is completely released and recovers to the original uncompressed state.

The foregoing paragraphs clearly describe the operation of spring type hinge apparatus 100. Also, it is known that the open-close situation of cellular phone (180°~0°) with the reference of FIG. 2.

Generally, when the cellular phone is opened from the closed position to the angle â, an external force is required to open the cover 200. In the meanwhile, the second cam 106 and the first cam 104 have approached the unstable state and attain the critical situation (which the convex portions are against to each other). Also, the spring 108 is compressed to the shortest condition. When the cellular phone keeps opening from the angle â to the full-opened position, the compressed spring 108 releases the elastic recovery force and pushes the second cam 106 to engage the first cam 104. Accordingly, the cellular phone equipped with the spring type hinge apparatus 100 possesses snap characteristic, wherein the cover in a certain angle is snapped into the full-opened position (ranged from â to 180°) or snapped into the closed position (ranged from â to 0°), without applying any external force.

However, the conventional spring type hinge apparatus 100 will loss the property of returning to the initial state following deformation after frequent usage. Also, it requires more space to install the spring type hinge apparatus 100 since the spring 108 occupies certain room. This increases the overall size of applied product.

SUMMARY OF THE INVENTION

It is therefore an object of the invention to provide a magnetic hinge apparatus to substitute the elastic force of conventional spring by the principle of magnetism. Because the like poles repel each other and the unlike poles attract each other, the product secured by the magnetic hinge apparatus of the invention possesses the snapping characteristic.

The invention achieves the above-identified objects by providing a magnetic hinge apparatus for connecting the cover and the base of the foldable product. The magnetic hinge apparatus comprises a shaft, the first, second, and third magnetic cams. In the practical application, the first magnetic cam connected to the base can be arranged on one end of the shaft, while the other end of the shaft is installed with the third magnetic cam. The second magnetic cam connected to the cover can be aligned between the first and the third magnetic cams. Both the second and third cams are connected to the cover. What the point of the invention is either the attractive force existing in the opposite profiles of the first magnetic cam and the second magnetic cam, or the repulsion force existing in the opposite profiles of the second magnetic cam and the third magnetic cam, or a combination thereof. The principle of magnetism makes the first magnetic cam and the second magnetic cam engage spontaneously.

Moreover, both opposite profiles of the first magnetic cam and the second magnetic cam have a convex portion and a convex portion. When the foldable product is full-closed, the convex portion of the second magnetic cam engages the concave portion of the first magnetic cam. When the cover of applied product is opened by an external force, the convex portion of the second magnetic cam is separated from the concave portion of the first magnetic cam, and slides on the profile of the first magnetic cam; meanwhile, the second magnetic cam moves toward the third magnetic cam. When the cover keeps opening and both concave portions of the first magnetic cam and the second magnetic cam touch each other, both cams are in the unsteady state. If the cover keeps opening, both concave portions of the first magnetic cam and the second magnetic cam will be separated; meanwhile, the attractive force (between the first magnetic cam and the second magnetic cam) and repulsion force (between the second magnetic cam and the third magnetic cam) are going to push the second magnetic cam. Under this condition, even the applying external force disappears, the second magnetic cam will spontaneously move towards the first magnetic cam until complete engagement is achieved. As a result, the cover is automatically opened to the full-opened state. Similarly, the magnetic hinge apparatus works in reverse order while the cover is rotated from the full-opened position to full-closed position. Accordingly, the foldable product secured by the magnetic hinge apparatus possesses snap characteristic.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 3A:
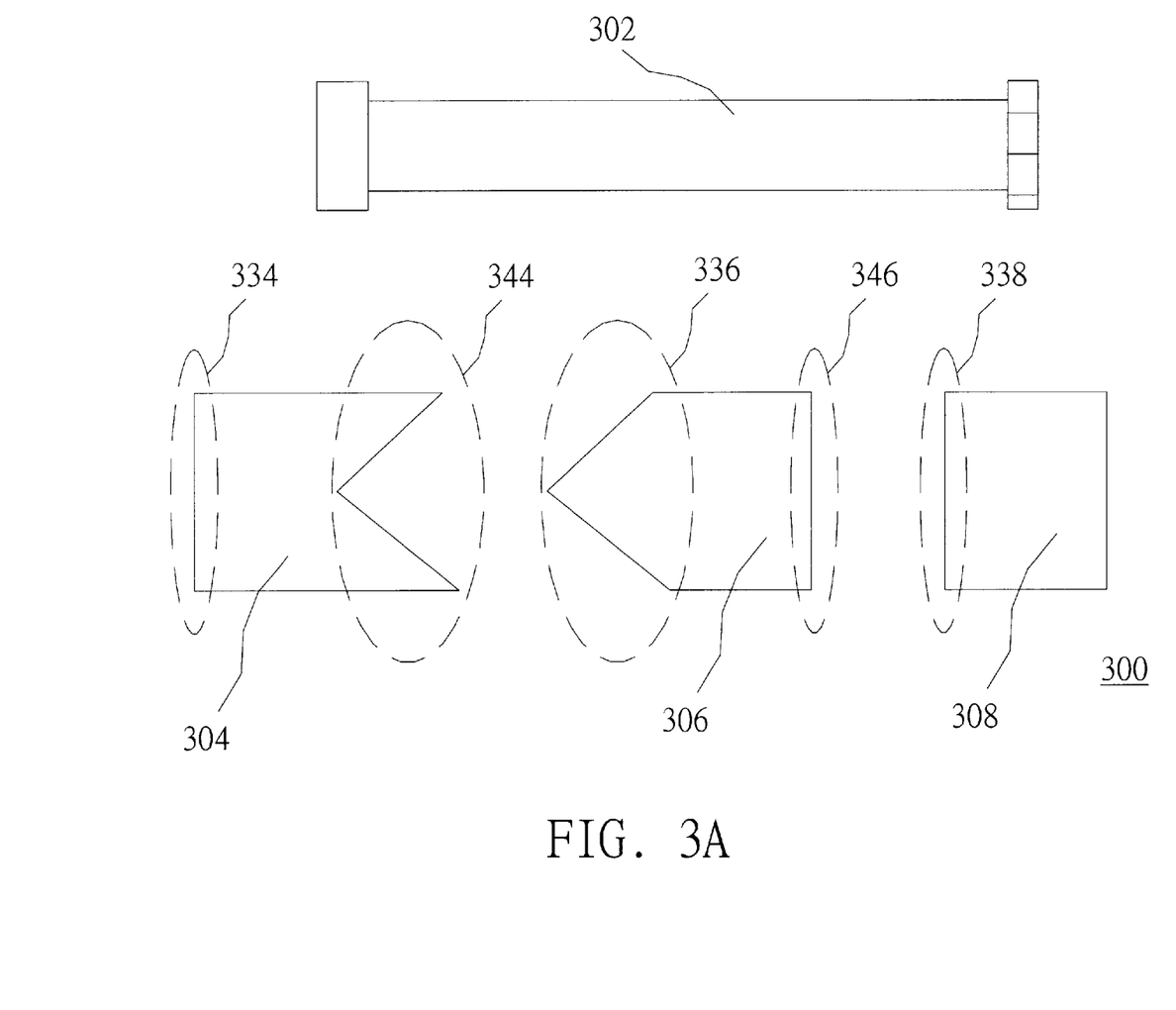
FIG. 3A is a side view of the magnetic hinge apparatus according to an embodiment of the invention.

Referring to FIG. 3A, which is a side view of the magnetic hinge apparatus according to an embodiment of the invention. The magnetic hinge apparatus 300 includes a flanged shaft 302, a first magnetic cam 304, a second magnetic cam 306, and a third magnetic cam 308. The first magnetic cam 304 has the profiles 334 and 344, the second magnetic cam 306 has the profiles 336 and 346, and the third magnetic cam 308 has a profile 338.

Also, the profile 344 of the first magnetic cam 304 and the profile 336 of the second magnetic cam 306 possess the opposite polarities. On the contrary, the profile 346 of the second magnetic cam 306 and the profile 338 of the third magnetic cam 308 possess the like polarities. For example, if the profile 344 is determined to be a north (N) magnetic pole, the profiles 336, 346, and 338 are respectively a south (S), a north (N), and a north (N) magnetic pole. Accordingly, the profile 344 attracts the profiles 336 while the profile 346 repels the profile 338.

Figure 3B:
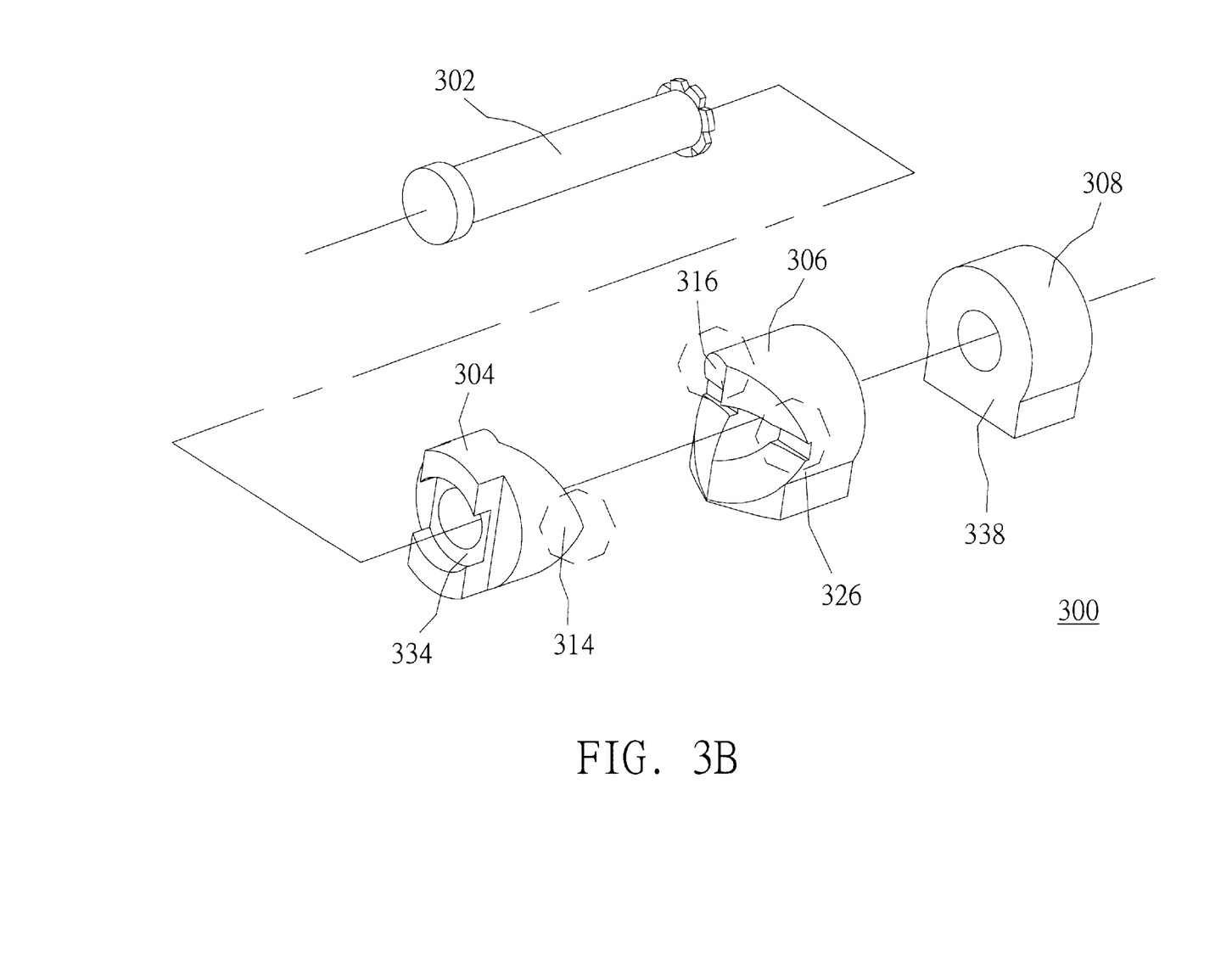
FIG. 3B is a three-dimensional drawing of magnetic hinge apparatus of FIG. 3A.

FIG. 3B is a three-dimensional drawing of magnetic hinge apparatus of FIG. 3A. The profile 344 of the first magnetic cam 304 further comprises a couple of convex portion 314 and concave portion (concave portion not shown in FIG. 3B due to the view angle limitation). The profile 336 of the second magnetic cam 306 further comprises a convex portion 316 and concave portion 326, wherein the concave portion 326 engages the convex portion 314 and the convex portion 316 engages the concave portion of the first magnetic cam 304.

Figure 3C:
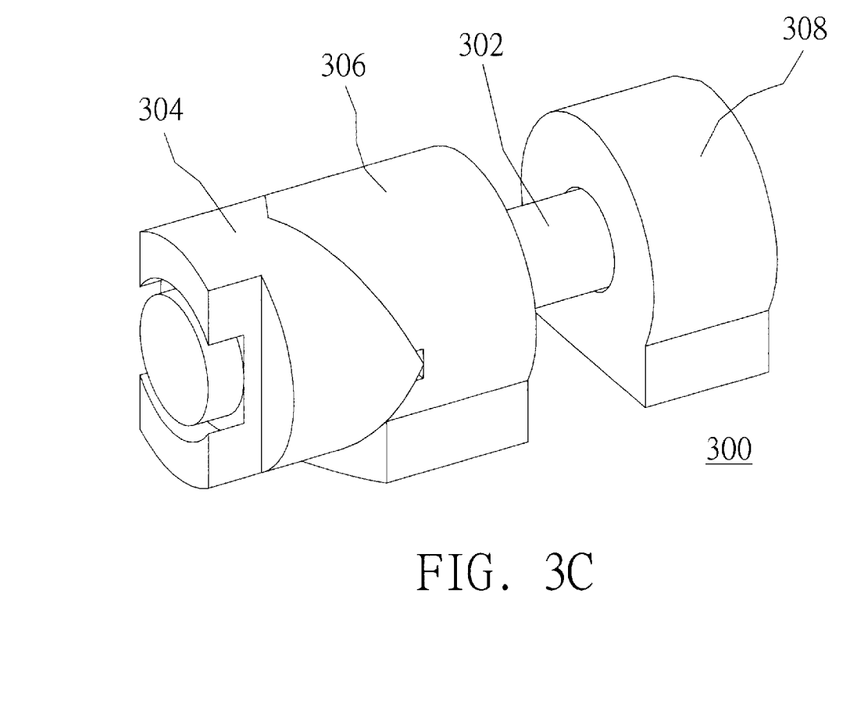
FIG. 3C is the assembled magnetic hinge apparatus according to an embodiment of the invention.

FIG. 3C is the assembled magnetic hinge apparatus according to an embodiment of the invention. The first magnetic cam 304, the second magnetic cam 306, and the third magnetic cam 308 are mounted on the flanged shaft 302 one by one. Then, one end of the flanged shaft 302 is embossed in order to hold the third magnetic cam 308 from dropping out. The first magnetic cam 304 and the third magnetic cam 308 are positioned at two ends of the flanged shaft 302. Because the profiles 344 and 336 possess opposite polarities, the first magnetic cam 304 and the second magnetic cam 306 are attracted to each other and engaged together. The profiles 338 and 346 possess like polarities, so that the second magnetic cam 306 and the third magnetic cam 308 repel to each other in a certain distance.

Figure 3D:
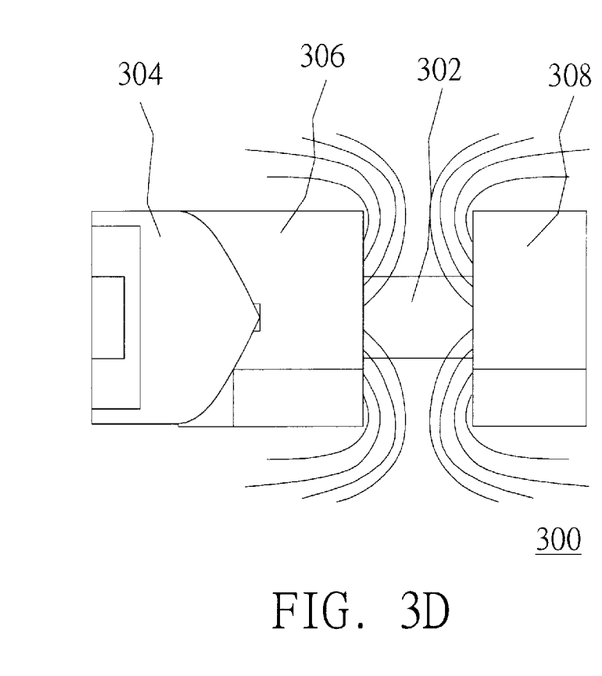
FIG. 3D is a side view of magnetic hinge apparatus of FIG. 3C.

FIG. 3D is a side view of magnetic hinge apparatus of FIG. 3C. The broken lines represent the lines of magnetic force, wherein the repellent lines of magnetic force indicates that the profile 346 of the second magnetic cam 306 has the same polarity as the profile 338 of the third magnetic cam 308 (i.e. both are N magnetic poles or S magnetic poles). Because the profile 336 of the second magnetic cam 306 has completely engaged the profile 344 of the first magnetic cam 304, the attractive lines of magnetic force between both profiles are not shown in FIG. 3D.

The magnetic hinge apparatus 300 of the invention is applicable to different kinds of folding product. In this preferred embodiment, a folding cellular phone is taken to illustrate how the magnetic hinge apparatus 300 works.

Figure 4A:
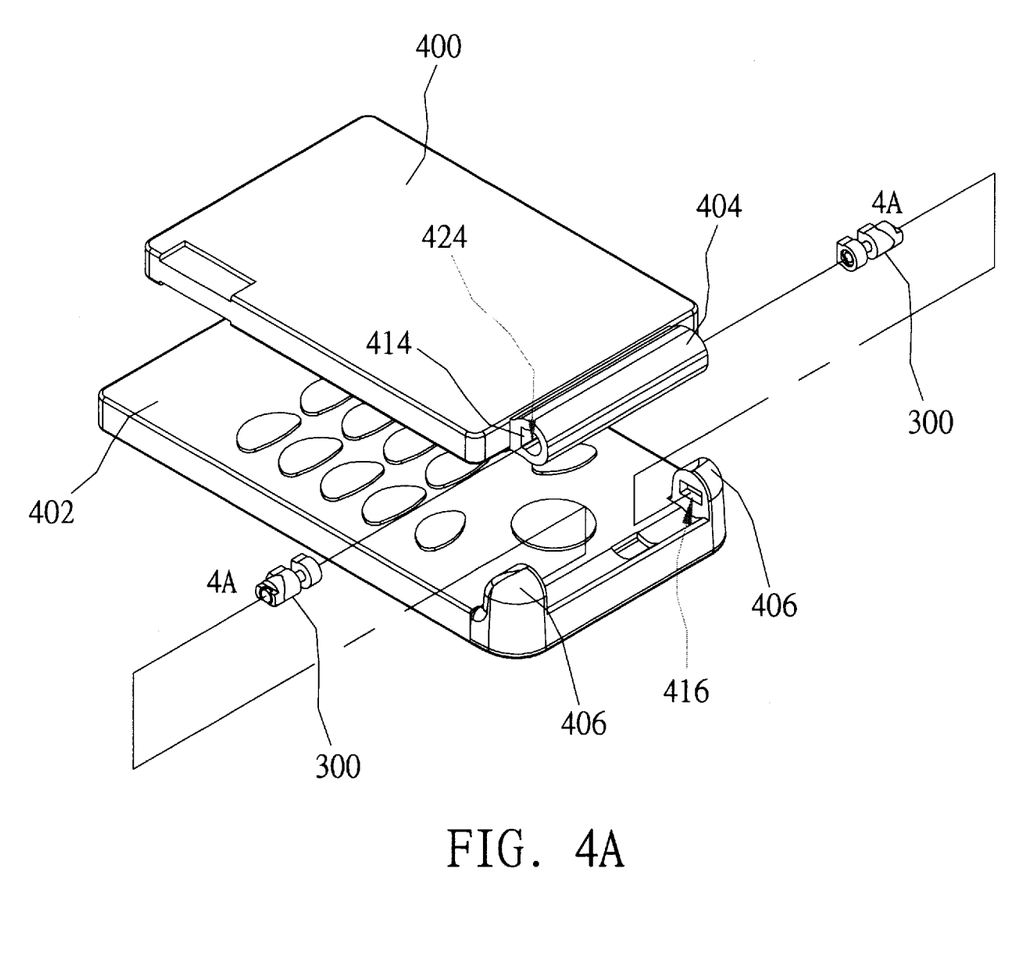
FIG. 4A is an explored drawing of the folding cellular phone secured by the magnetic hinge apparatus according to the embodiment of the invention.

FIG. 4A is an explored drawing of the folding cellular phone secured by the magnetic hinge apparatus according to the embodiment of the invention. The cellular phone comprises a cover 400 and a base 402. A sleeve 404 resided behind the cover 400 is used for fitting the hinge. Hence, an aperture 414 is further formed in each end of the sleeve 404, and has identical sectional area as the magnetic hinge apparatus 300 does. Also, there are a groove 424 formed in the aperture 414 and two knuckles 406 resided in two rear ends of the base 402. A socket 416, a female-type connector formed in a surface of knuckle 406, is shaped to accept and secure a suitably shaped prong of magnetic hinge apparatus 300. During assembly of the cover 400 and the base 402, the magnetic hinge apparatus 300 is inserted into the aperture 414 of the sleeve 404, and then engaged with the socket 416 of the knuckle 406.

Figure 4B:
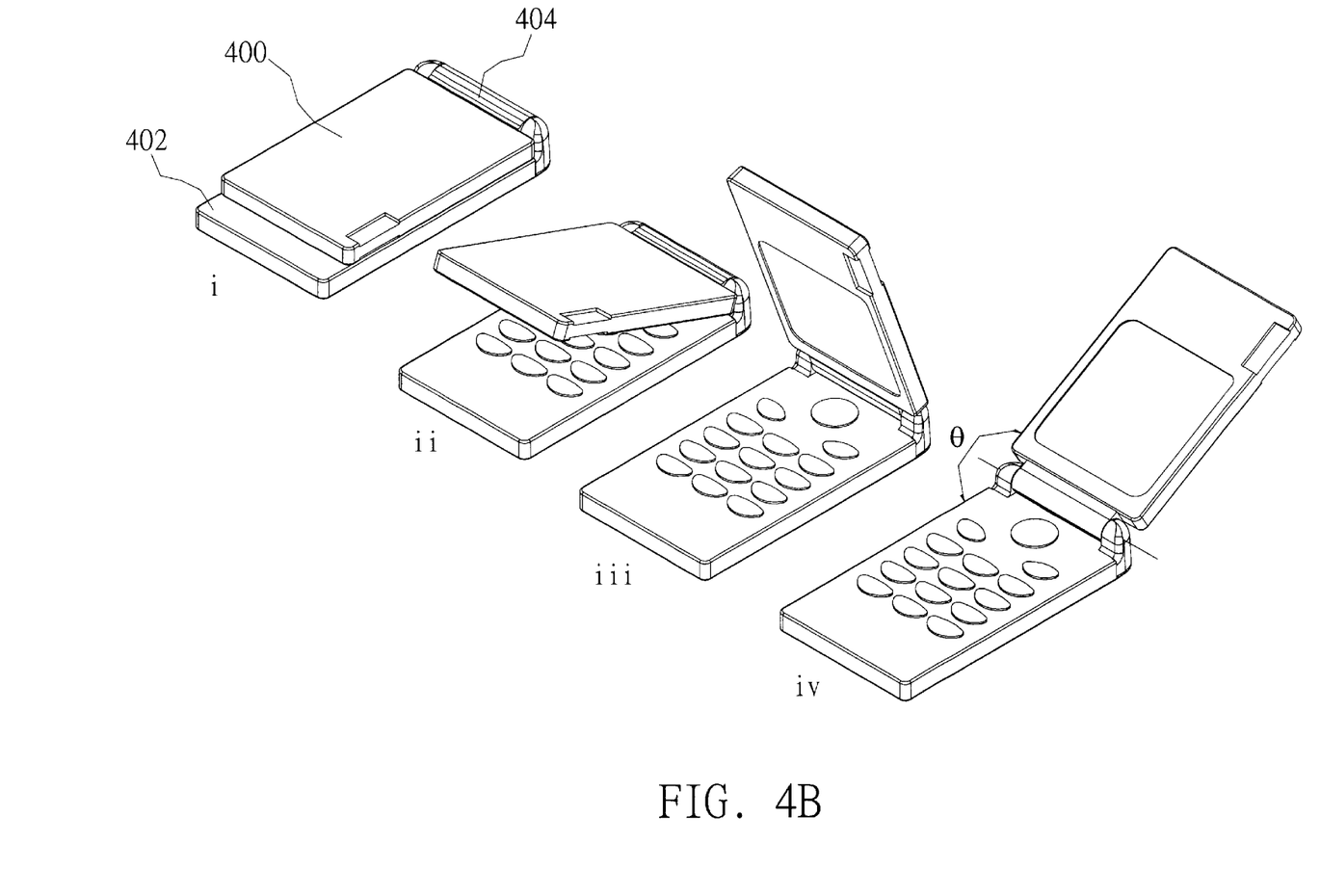
FIG. 4B shows the folding actions of the cellular phone assembled with the magnetic hinge apparatus of FIG. 4A.

FIG. 4B shows the folding operations of the cellular phone assembled with the magnetic hinge apparatus of FIG. 4A. After completely assembly, the magnetic hinge apparatus 300 allows the pivoting of the cover 400 on the base 402, along 4A—4A axis of rotation (shown in FIG. 4A). In FIG. 4B, (i) and (iv) depict a full-closed and a full-opened positions of the cellular phone, respectively. e,acu represents the maximum opening angle between the cover 400 and the base 402.

Figure 5A:
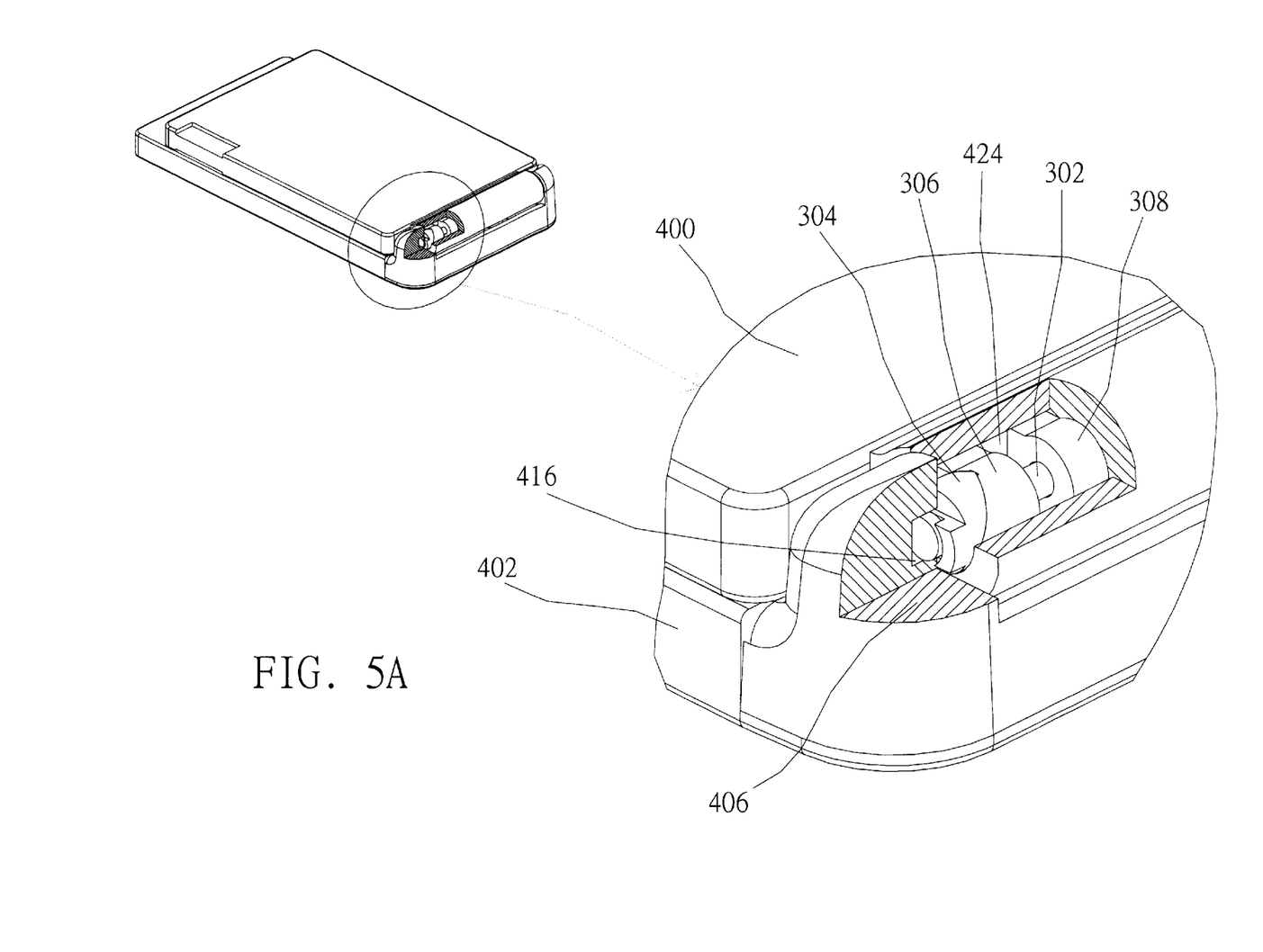
FIG. 5A is an enlarged, perspective view of the magnetic hinge apparatus resided in the full-closed cellular phone of FIG. 4B.

FIG. 5A is an enlarged, perspective view of the magnetic hinge apparatus resided in the full-closed cellular phone of FIG. 4B. In FIG. 5A, the socket 416 of the knuckle 406 accepts and secures the first magnetic cam 304; therefore, it doesn't allow the turning of the first magnetic cam 304 in the socket 416. The bottom of the second magnetic cam 306 is jointed to the groove 424 of the sleeve 404. By particular design in the shapes of the groove 424 and bottom of the second magnetic cam 306, the second magnetic cam 306 is able to move transversely along the flanged shaft 302 only. Also, the bottom of the third magnetic cam 308 is jointed to the groove 424. Because the opposite profiles of the first magnetic cam 304 and the second magnetic cam 306 possess the opposite polarities, they attract to each other naturally, wherein the concave portion 326 and the convex portion 316 of the second magnetic cam 306 engage the convex portion 314 and the concave portion of the first magnetic cam 304. On the other hand, the opposite profiles of the second magnetic cam 306 and the third magnetic cam 308 possess the same polarity, so that magnetic repulsion keeps the third magnetic cam 308 and the movable second magnetic cam 306 in the shaft as far as they can.

Figure 5B:
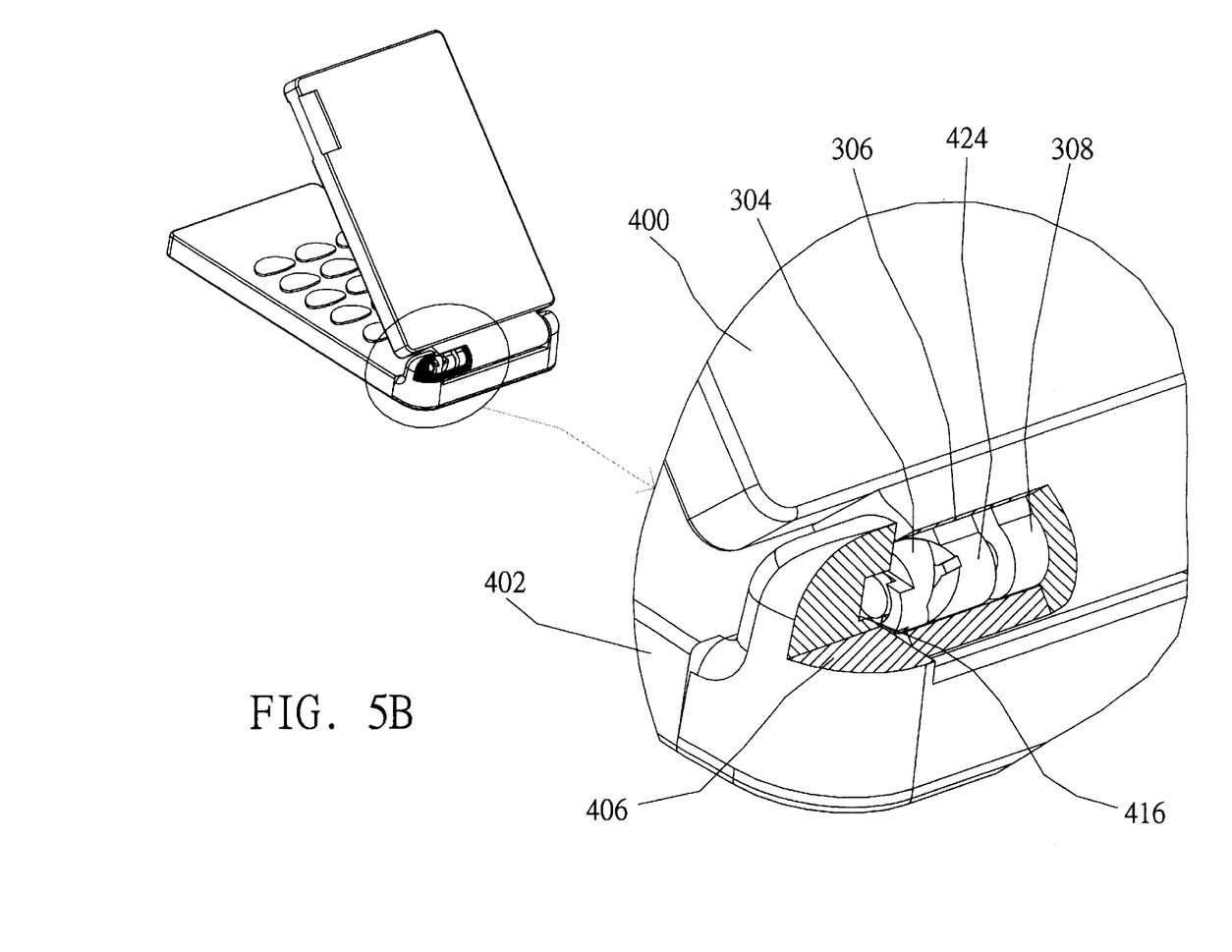
FIG. 5B is an enlarged, perspective view of the magnetic hinge apparatus resided in the opened cellular phone of FIG. 4B.

FIG. 5B is an enlarged, perspective view of the magnetic hinge apparatus resided in the opened cellular phone of FIG. 4B. When the cover 400 of the cellular phone is opened, the first magnetic cam 304 is not able to rotate in the socket 416 but the second magnetic cam 306 jointed to the groove 424 of the sleeve 404 rotates along with the cover 400, as shown in FIG. 5B. The convex portion 316 of the second magnetic cam 306 separates from the concave portion of the first magnetic cam 304, and both cams cannot completely engage to each other. Consequently, the second magnetic cam 306 moves toward the third magnetic cam 308 along the flanged shaft 302. In the meanwhile, an external force is required to overcome not only the attractive force between the first magnetic cam 304 and the second magnetic cam 306, but also the magnetic repulsion between the second magnetic cam 306 and the third magnetic cam 308.

Moreover, the curve in FIG. 2 can represent the operation of magnetic hinge apparatus while applied in the folding cellular phone. Simply saying, a magnetic cam substitutes the spring 108 of FIG. 2 and magnetic material are adopted in the invention. It is a great improvement that elastic recovery force of the conventional spring is replaced with magnetic repulsion of the cams having the same polarity. Also, the magnetic force between the opposite polarities makes the cams to be jointed easy to engage again.

In the present invention, the first cam 104, the second cam 106 and the spring 108 of FIG. 2 are replaced by the first magnetic cam 304, the second magnetic cam 306 and the third magnetic cam 308, respectively. The diagram, that exhibits the relationship between the rotating angle é (between the first magnetic cam 304 and the second magnetic cam 306) and position of the second magnetic cam 306 on the flanged shaft 302, is the same as FIG. 2. Therefore, the folding cellular phone secured by the magnetic hinge apparatus 300, like secured by the spring type hinge apparatus 100, possesses the characteristic that: when the cover is opened to a certain angle and the external force is gone, the cover can automatically snap into the full-opened position or snap into the closed position.

Compared to the conventional spring type hinge apparatus 100, the point of the magnetic hinge apparatus 300 is that the third magnetic cam 308 substitutes the spring 108, and the first magnetic cam 304, the second magnetic cam 306 substitute the first cam 104 and the second cam 106 made by traditional material. Furthermore, there are an attractive force between the first magnetic cam 304 and the second magnetic cam 306, and a repulsion force between the second magnetic cam 306 and the third magnetic cam 308. Correspondingly, the second magnetic cam 306 is able to move more steadily and rapidly towards the first magnetic cam 304.

According to the aforementioned embodiment, three cams of the hinge apparatus are made by magnetic material. However, the invention is not limited hereto. The operation of magnetic hinge apparatus still works well under certain conditions. It is not a required restriction that all cams are magnetic. For example, if the first and the second cams are the only components made by magnetic material, the attractive force existing between the profiles 344 and 336 (which have the opposite polarities) is able to bring two cams back to the engaged position while the external forced disappears. In another case, if the second and the third cams are the only components made by magnetic material, the operation of the magnetic hinge apparatus 300 is achieved by the repulsion force between two cams. Therefore, the applied product such as folding cellular phone still possesses flip characteristic, and the problem of elastic deformation caused by the conventional spring is also solved.

Additionally, the third magnetic cam 308 could be omitted in the present invention. The operation of the hinge apparatus is achieved by using the mutual attractive force between the first magnetic cam 304 and the second magnetic cam 306.

However, the one of ordinary skill in the art should know that the invention is not limited to the disclosed embodiment. The way of connecting each component of the magnetic hinge apparatus to the cover or the base can be modified on the premise that the first magnetic cam 304 and the second magnetic cam 306 are able to separate and engage smoothly. So, the cover and the base of applied product can snap into the full-opened or closed position, without continuously applying the external force.

In the preferred embodiments described herein, the advantages of the magnetic hinge apparatus 300 of the invention are summarized as follows:

1. all components of the magnetic hinge apparatus 300 are made by the magnetic material. Because the unlike poles (of the first magnetic cam 304 and the second magnetic cam 306) attract each other, and/or like poles (of the second cam 306 and the third cam 308) repel each other, the second magnetic cam 306 can move steadily and rapidly toward the first magnetic cam 304. Thus, the product secured by the magnetic hinge apparatus 300 possesses snapping characteristic.

2. A conventional spring type hinge apparatus could face the problem of elasticity decay after frequent usage. This problem is solved by using magnetic cams of the invention. The repulsion force of two magnetic cams substitutes the elastic recovery force of spring, so that the utility life span of hinge apparatus is greatly prolonged.

3. in the practical application, a useful magnetic cam is smaller than a spring; hence, the overall size of applied product can be reduced.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A magnetic hinge apparatus, comprising:
   a shaft;
   a first magnetic cam located on one end of the shaft, the first magnetic cam having a first profile an a second profile, the second profile comprising a convex portion and a concave portion;
   a second magnetic cam located on the shaft, the second magnetic cam having a third profile and a fourth profile, the third profile comprising a concave portion and a convex portion to engage the convex portion and the concave portion of the first magnetic cam, wherein the third profile and the second profile have opposite polarities; and
   a third magnetic cam located on the other end of the shaft, the third magnetic cam having a fifth profile, wherein the fifth profile and the fourth profile are set opposite and have the same polarity.

2. The magnetic hinge apparatus according to claim 1, wherein the first profile is a north (N) magnetic pole, the second profile is a south (S) magnetic pole, the third profile is a north (N) magnetic pole, the fourth profile is a south (S) magnetic pole, and the fifth profile is a south (S) magnetic pole.

3. The magnetic hinge apparatus according to claim 1, wherein the first profile is a south (S) magnetic pole, the second profile is a north (N) magnetic pole, the third profile is a south (S) magnetic pole, the fourth profile is a north (N) magnetic pole, and the fifth profile is a north (N) magnetic pole.

4. The magnetic hinge apparatus according to claim 1, wherein one end of the shaft is embossed.

5. The magnetic hinge apparatus according to claim 1 is applied to a foldable product.

6. The magnetic hinge apparatus according to claim 5, wherein the foldable product is a cellular phone.

7. A magnetic hinge apparatus, comprising:
   a shaft;
   a first magnetic cam located on one end of the shaft, the first magnetic cam having a first profile an a second profile, the second profile comprising a convex portion and a concave portion; and
   a second magnetic cam located on the shaft, the second magnetic cam having a third profile and a fourth profile, the third profile comprising a concave portion and a convex portion to engage the convex portion and the concave portion of the first magnetic cam;
   wherein the third profile and the second profile have opposite polarities, when the first magnetic cam and the second magnetic cam are separated by an external force, an attractive force due to unlike magnetic poles is formed between the two cams, the attractive force engages both cams while the external force is disappeared.

8. The magnetic hinge apparatus according to claim 7, wherein the first profile is a north (N) magnetic pole, the second profile is a south (S) magnetic pole, the third profile is a north (N) magnetic pole, and the fourth profile is a south (S) magnetic pole.

9. The magnetic hinge apparatus according to claim 1, wherein the first profile is a south (S) magnetic pole, the second profile is a north (N) magnetic pole, the third profile is a south (S) magnetic pole, and the fourth profile is a north (N) magnetic pole.

10. A magnetic hinge apparatus, comprising:
    a shaft;
    a first cam located on one end of the shaft, the first cam having a first profile an a second profile, the second profile comprising a convex portion and a concave portion;

a second magnetic cam located on the shaft, the second magnetic cam having a third profile and a fourth profile, the third profile comprising a concave portion and a convex portion to engage the convex portion and the concave portion of the first magnetic cam; and a third magnetic cam located on the other end of the shaft, the third magnetic cam having a fifth profile;

wherein the fifth profile and the fourth profile are set opposite and have the same polarity, when the second magnetic cam moves toward the third magnetic cam, the magnetic repulsion force between the two like poles drives the second magnetic cam back to the original position.

11. A cellular phone secured by a magnetic hinge apparatus, comprising a cover, a base, and a magnetic hinge apparatus for allowing the pivoting of the cover on the base, the magnetic hinge apparatus comprising:

a shaft;

a first magnetic cam located on one end of the shaft, having a first profile an a second profile, the second profile comprising a convex portion and a concave portion;

a second magnetic cam located on the shaft, having a third profile and a fourth profile, the third profile comprising a concave portion and a convex portion to engage the convex portion and the concave portion of the first magnetic cam, wherein the third profile and the second profile have opposite polarities; and a third magnetic cam located on the other end of the shaft, having a fifth profile, wherein the fifth profile and the fourth profile are set opposite and have the same polarity, wherein the first magnetic cam is connected to the base, the second magnetic cam and the third magnetic cam are connected to the cover.

12. The cellular phone secured by a magnetic hinge apparatus according to claim 11, wherein the first profile is a north (N) magnetic pole, the second profile is a south (S) magnetic pole, the third profile is a north (N) magnetic pole, the fourth profile is a south (S) magnetic pole, and the fifth profile is a south (S) magnetic pole.

13. The cellular phone secured by a magnetic hinge apparatus according to claim 11, wherein the first profile is a south (S) magnetic pole, the second profile is a north (N) magnetic pole, the third profile is a south (S) magnetic pole, the fourth profile is a north (N) magnetic pole, and the fifth profile is a north (N) magnetic pole.

14. A cellular phone secured by a magnetic hinge apparatus, comprising a cover, a base, and a magnetic hinge apparatus for allowing the pivoting of the cover on the base, the magnetic hinge apparatus comprising:

a shaft;

a first magnetic cam located on one end of the shaft, having a first profile an a second profile, the second profile comprising a convex portion and a concave portion; and a second magnetic cam located on the shaft, having a third profile opposite to the second profile, the third profile comprising a concave portion and a convex portion to engage the convex portion and the concave portion of the first magnetic cam, wherein the third profile and the second profile have relative polarities;

wherein the first magnetic cam is connected to the base, the second magnetic cam and the third magnetic cam are connected to the cover.

15. The cellular phone secured by a magnetic hinge apparatus according to claim 14, wherein the first profile is a north (N) magnetic pole, the second profile is a south (S) magnetic pole, and the third profile is a north (N) magnetic pole.

16. The cellular phone secured by a magnetic hinge apparatus according to claim 14, wherein the first profile is a south (S) magnetic pole, the second profile is a north (N) magnetic pole, and the third profile is a south (S) magnetic pole.

17. A cellular phone secured by a magnetic hinge apparatus, comprising a cover, a base, and a magnetic hinge apparatus for allowing the pivoting of the cover on the base, the magnetic hinge apparatus comprising:

a shaft;

a first cam located on one end of the shaft and connected to the base, the first cam having a first profile an a second profile, the second profile comprising a convex portion and a concave portion;

a second magnetic cam located on the shaft and connected to the cover, the second magnetic cam having a third profile and a fourth profile, the third profile opposite to the second profile and having the opposite polarity thereof, also the third profile comprising a concave portion and a convex portion to engage the convex portion and the concave portion of the first magnetic cam; and a third magnetic cam located on the other end of the shaft and having a fifth profile;

wherein the fifth profile and the fourth profile are set opposite and have the same polarity, when the second magnetic cam moves toward the third magnetic cam, the magnetic repulsion force between the two like poles drives the second magnetic cam back to the original position.

\* \* \* \* \*